SETTABLE MAGNETIC INTEGRATOR

Filed Dec. 30, 1958 2 Sheets-Sheet 1

INVENTOR.
DONALD H. WHEELER

BY

J. M. St. Amand
ATTORNEYS.

Dec. 5, 1961 D. H. WHEELER 3,011,714

SETTABLE MAGNETIC INTEGRATOR

Filed Dec. 30, 1958 2 Sheets-Sheet 2

INVENTOR.
DONALD H. WHEELER

BY

J. M. St. Amand

ATTORNEYS.

United States Patent Office 3,011,714
Patented Dec. 5, 1961

3,011,714

SETTABLE MAGNETIC INTEGRATOR

Donald H. Wheeler, China Lake, Calif., assignor to the United States of America as represented by the Secretary of the Navy Filed Dec. 30, 1958, Ser. No. 784,002
5 Claims. (Cl. 235—183)
(Granted under Title 35, U.S. Code (1952), sec. 266)

The invention herein described may be manufactured and used by or for the Government of the United States of America for governmental purposes without the payment of any royalties thereon or therefor.

The present invention relates to analogue electronic computers and more particularly to a settable magnetic integrator for use in analogue computer applications. The new circuit of the present invention, as disclosed herein, consists of a magnetic integrator used in combination with a transistorized programming circuit. This new circuit offers the capability of having a settable total-integral value, and has this total integral value fixed by the magnetic and physical characteristics of the integrating coil.

It is an object of the present invention to provide a magnetic integrator which will give a measure of the time integral of a voltage where the voltage may vary in magnitude and may, under certain conditions, be zero or even negative.

Another object of the present invention is to provide a magnetic integrator having a settable total-integral value.

A further object of the present invention is to provide a magnetic integrator for use in analogue electronic computers wherein the maximum integral value is fixed by the magnetic and physical characteristics of the integrating coil.

Other objects and many of the attendant advantages of this invention will become readily appreciated as the same becomes better understood by reference to the following detailed description when considered in connection with the accompanying drawings where:

The integrator as used in the present invention is intended to provide a measure of the time integral of a voltage, $e$, where $e$ may vary in magnitude and may, under certain conditions, be zero or even negative.

The basis of operation lies in the nature of inductors which dictates that $$e=kN\int\frac{d\phi}{dt}$$

or $$\int edt=\int kN\,d\phi$$

where N=number of turns, $\phi$=flux, $t$=time and $k$=constant. For saturable core materials, there is a well-defined negative saturation and positive saturation flux (for a given core at a given temperature). Hence if one can assign these as limits of integration on the right side of the equation, integrating from time $t=0$ to $t=T$, where N is constant, and $\phi s$=saturation flux $$\int_0^T edt=N\int_{-\phi s}^{+\phi s}d\phi$$

or $$\int_0^T edt=2N\phi s$$

The right hand side of the equation is constant for given coil. This makes a saturable core magnetic integrator feasible for performing integrations where a continuous read-out is not required.

The permeability of the core material changes very abruptly at saturation. This makes possible a signal indicating that saturation is reached.

Figure 1:
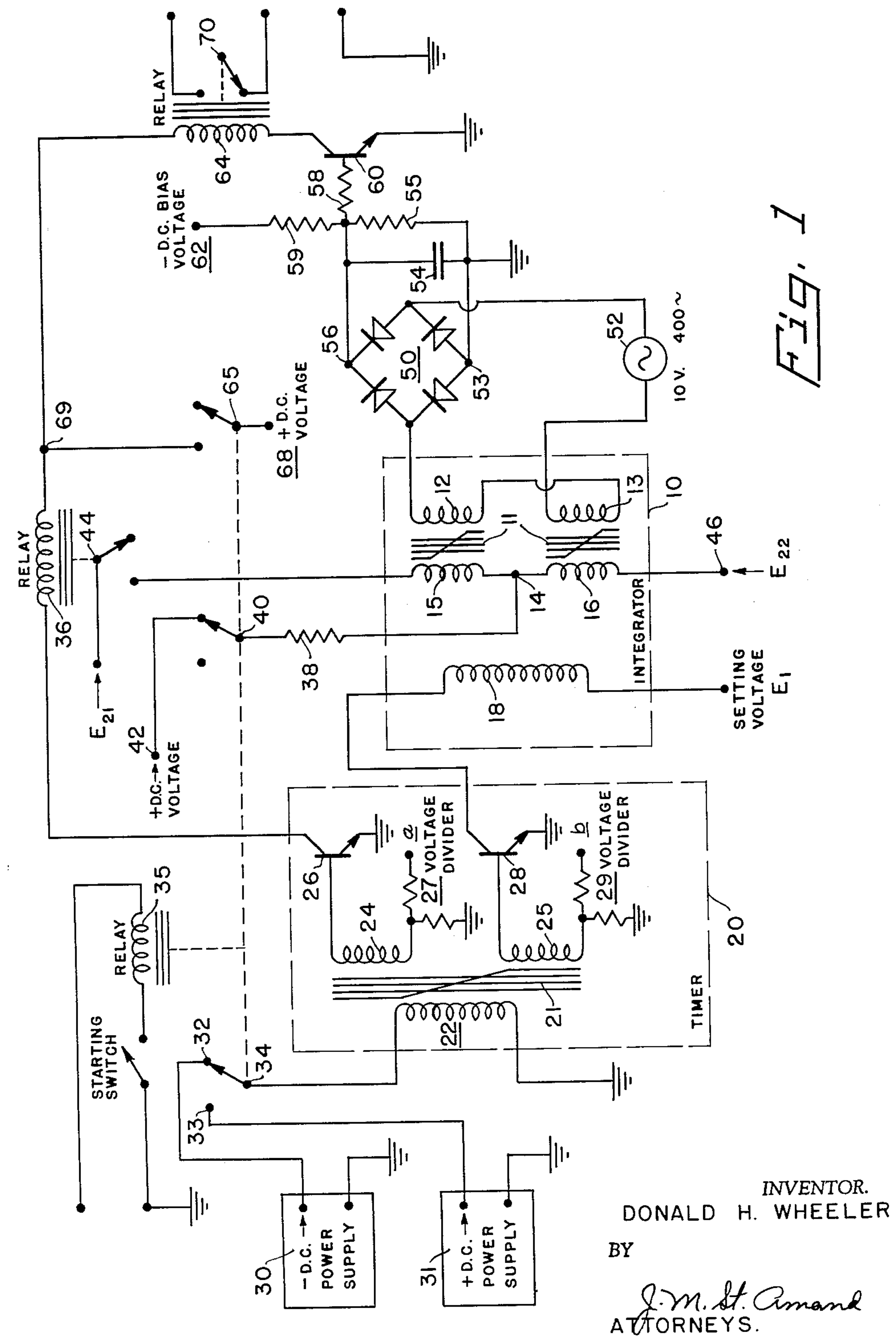
FIG. 1 is a schematic diagram of the electronic circuitry of the settable magnetic integrator of the present invention.

The integrator 10, shown in FIG. 1, has been successfully employed for performing the aforementioned function. The integrating core 11 consists of two separate saturable reactor cores having A.C. windings 12 and 13 thereon. The circuit of integrator 10 is connected like a conventional series connected magnetic amplifier. The number of A.C. turns and the A.C. voltage applied, however, are such that only small flux excursions due to the A.C. for any cycle are possible.

The A.C. windings 12 and 13 on double core 11 serve a two-fold purpose. Their impedance changes abruptly at saturation, giving rise to a sharply rising voltage across their output. This output voltage may be used to trigger a relay circuit. Another function of the A.C. windings, during the unsaturated operating time of reactors 12 and 13, is to supply core losses, which otherwise would have to be supplied as current in the D.C. winding (integrating windings 15 and 16).

A voltage to be integrated is applied across the D.C. winding, i.e., integrating windings 15, 16. For the present embodiment of the invention, a tap 14 is provided, dividing the D.C. winding into windings 15 and 16 so that two different ranges of integration may be used, by switching between the tap 14 and the other end of either of windings 15 or 16. A set-in winding 18 is also included in integrator 10.

In the entire circuit illustrated in FIG. 1 is included, in addition to integrator 10, a timer 20 comprising a saturable transformer 21, having a primary winding 22, and two secondary windings 24 and 25 which are wound in opposite directions on core 21. One end of secondary winding 24 is connected to the base of an n-p-n transistor 26, the other end of the winding being connected to the tap of voltage divider 27. The potential applied to the base of transistor 26 is positive with relation to the emitter since the potential at point "$a$" of voltage divider 27 is positive with relation to ground. One end of secondary winding 25 is connected to the base of n-p-n transistor 28, and has its other end connected to the tap of voltage divider 29. The potential applied to the base of transistor 28 is negative with relation to the emitter since the potential at point "$b$" of voltage divider 29 is negative with relation to ground. When transformer 21 is saturated, transistor 26 is "on" and transistor 28 is "off" since their respective bases are positive and negative. A regulated power supply 30 is provided for supplying a —D.C. voltage to primary winding 22 of saturable transformer 21. A second regulated power supply 31 is provided for supplying a +D.C. voltage to primary winding 22. In practice, the power for voltage divider 27 can be obtained from positive D.C. power supply 31 and the power for voltage divider 29 from negative D.C. power supply 30.

D.C. power supplies 30 and 31 are connected to terminals 32 and 33 respectively, and to primary winding 22 through relay switch 34 operated by relay 35. In its initial position, as illustrated in FIG. 1, relay switch 34 is switched to terminal 32 and —D.C. voltage 30. The collector of transistor 28 is connected to the start end of winding 18 of magnetic integrator 10, and the collector of transistor 26 is connected to one end of the coil of relay 36. Center tap 14 between windings 15 and 16 of integrator 10 is connected, through resistor 38, to relay switch 40 which is also operated by relay 35. Relay switch 40, in its initial position and closed as in FIG. 1, connects a +D.C. bias voltage at terminal 42 to the tap between coils 15 and 16. The other end of winding 15 is connected to a terminal of relay switch 44 which, when closed, connects the end of winding 15 to a source of D.C. voltage, $E_{21}$. The other end of winding 16 is connected to terminal 46 which in turn is connected to a source of D.C. voltage, $E_{22}$.

A.C. windings 12 and 13 are series connected; the other ends of windings 12 and 13 are connected across a bridge rectifier 50. An A.C. power supply 52 is provided in the lead wire from winding 13 to bridge rectifier 50. Power supply 52 may be a 10 volt, 400 cycle A.C. source for instance, or any other suitable A.C. source. Rectifier output terminal 53 is connected to one end of capacitor 54, to one end of resistor 55 and to ground. The other rectifier output terminal 56 is connected to the other ends of capacitor 54 and resistor 55, and to one end of resistors 58 and 59. Resistor 58 has its opposite end connected to the base of n-p-n transistor 60, and operates to limit the base current thereto. A —D.C. bias voltage 62 is connected to the other end of resistor 59 which in turn supplies the off-bias to transistor 60.

The emitter of transistor 60 is connected to ground, and the collector is connected to one end of relay 64. The other end of relay 64 is connected to the end of relay 36; thus, relays 36 and 64 are connected together in series between the collectors of transistors 26 and 60. The electrical connection between relays 36 and 64 is also connected to one terminal of relay switch 65. Relay switch 65 is also operated by relay 35, and when closed switch 65 connects in a +D.C. voltage 68 at point 69 between relays 36 and 64. Relay 64 when activated operates relay switch 70.

This circuit is used in analogue computer applications, for performing integrations of the form:

$$X=\int_{t_1}^{T} e\,dt$$

when a setting-time is available prior to the start of integration. It is an extremely rugged circuit, due to the use of the semiconductor devices and stable magnetic materials for the cores, and has an accuracy of ± 1%, depending on environment.

The settable magnetic integrator, FIG. 1, will perform the following steps in sequence: Accept a D.C. voltage, $E_1$, proportional to the total integral desired; compute the integral of a voltage over a period of time; and, actuate a relay when the computed integral becomes equal to the desired total integral.

The operation of the circuit is as follows: Prior to time $t=0$, relay switches 34, 40 and 65 are in the positions as shown in FIG. 1 and integrating core 11 is held saturated by a saturating voltage applied between terminal 42 and $E_{22}$ at terminal 46 and impressed across winding 16; also, saturable transformer 21 is held saturated by a voltage from power supply 30 held impressed across primary winding 22. Relay switch 65 insures that relays 36 and 64 cannot energize prior to $t=0$. Prior to $t=0$, transistor switch 28 is "off" and transistor switch 26 is "on." Even though transistor 26 is "on," power is not applied to relay 36 since switch 65 is open. Feeding relay 64 also through switch 65 doubly insures that relay switch 70 is not actuated prematurely.

At time $t=0$, relay 35 is actuated by closing the starting switch, causing relay switches 34, 40 and 65 to move to the opposite position from that shown in FIG. 1. This removes the original saturating voltage applied between $E_{22}$ and terminal 42 from coil 16, which held core 11 in a saturated condition, since relay switch 40 will be in open position. Switch 34 will close to terminal 33 connecting power supply 31 across primary winding 22, applying an opposite polarity voltage thereto; this voltage is held during the period $0 \leqslant t \leqslant t_1$. During this period a nearly constant voltage is induced in both secondary windings 24 and 25. Since windings 24 and 25 are wound in opposite directions, the induced voltage in sceondary winding 24 biases the base of transistor 26 negative and the induced voltage in secondary winding 25 biases the base of transistor 28 positive thereby turning transistor 26 "off" and transistor 28 "on." Simultaneously with applying an opposite polarity voltage across winding 22, during the period $0 \leqslant t \leqslant t_1$, transistor 28 is turned "on" and most of the setting voltage $E_1$ appears across set-in winding 18 and a small part of $E_1$ appears across the collector-emitter of transistor 28. When transistor 28 is "off," most of $E_1$ appears across the collector-emitter of transistor 28 and a small part across winding 18. This setting voltage $E_1$ is integrated by integrating core 11, causing the flux in core 11 to move from the pre-saturated level to a level proportional to $\int(E_1-\Delta E_1)dt$ (where $\Delta E_1$ is the collector-to-emitter voltage of transistor 28 plus the voltage ($iR$) drop in winding 18, itself). In other words, during time $t=0$ to $t=t_1$ the flux of core 11 is changing from original saturation level toward opposite saturation level and becomes fixed at an intermediate flux level determined by setting voltage $E_1$, and the flux of saturable transformer 21 is changing from its original saturation level to the opposite saturation level. During this time transistor 28 is "on," and transistors 26 and 60 are "off."

At time $t=t_1$ the core of saturable transformer 21 reaches its new saturation, and the induced voltage in the secondary windings 24 and 25 drop sharply. The polarities and magnitudes of the induced voltages in windings 24 and 25 are such that during $0 \leqslant t \leqslant t_1$, transistor 28 is held "on" and transistor 26 is held "off." Then at time $t=t_1$, transistor 26 it switched "on" and transistor 28 is switched "off." Also, at $t=t_1$ when transistor 28 is switched "off," setting voltage $E_1$ appears almost wholely across transistor 28. When transistor 26 goes "on," relay 36 is energized, in turn applying a voltage to be integrated, $E_2=E_{21}-E_{22}$, to appear between terminals 44 and 46 and therefore across integrating windings 15 and 16 combined. Polarity is such that the flux of integrating core 11 starts back towards its original (prior to time $t=0$) saturation state. Saturable transformer 21 stays at its new saturation level and performs no further function than to hold itself at saturation and hold the relay switches in the same position.

During the time from $t=t_1$ to $t=T$, transistor 26 is "on," and transistors 28 and 60 are "off." Windings 15 and 16 are, during this time, integrating the voltage $(E_2-\Delta E_2)$; the $\Delta E_2$ is the $i$R-drop in the circuit, a small quantity. The flux excursion during this time interval is the same as in the previous interval, but changes to opposite direction.

At $t=T$, integrating cores 11 saturate causing a step increase of voltage to be applied between the base and emitter of transistor 60 causing it to go "on" and in turn energizing relay 64, which signals the integration is complete.

Saturation of cores 11 occurs when the flux in the cores has traversed the limits of the set-in flux-level (at $t=t_1$) to the same saturation level (approximate) which was held prior to $t=0$. Thus, the integration of $(E_2-\Delta E_2)$ takes place over the same flux excursion as did the integration of $(E_1-\Delta E_1)$. This flux excursion is proportioned to $(E_1-\Delta E_1)$ since $t_1$ is a fixed time. Consequently the integral $$\int_{t_1}^{T}(E_2-\Delta E_2)dt$$

is proportional to $(E_1-\Delta E_1)$.

Figure 2:
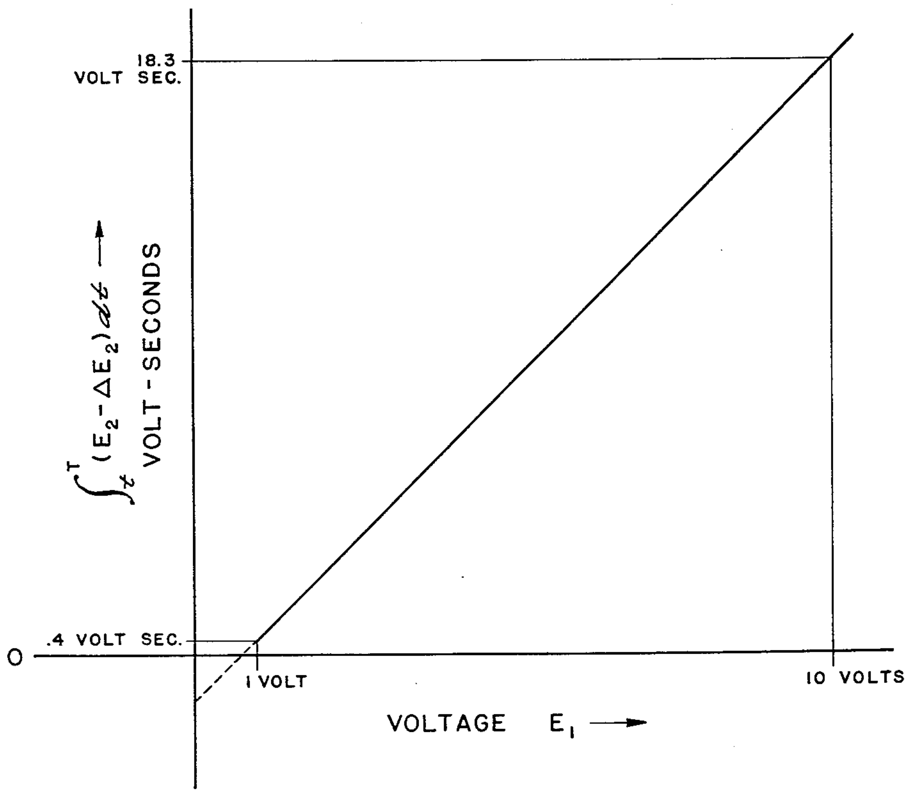
FIG. 2 is a graph showing typical operating characteristics of the present invention.

Plotting $$\int_{t_1}^{T}(E_2-\Delta E_2)dt$$

as a function of voltage of $E_1$ a general typical transfer as shown in FIG. 2 is obtained. This transfer is sufficiently straight to be useful in computer work and to demonstrate the validity of the foregoing description. The limits shown on the curve of FIG. 2 represent the approximate limits of the specific embodiment disclosed. However, the limits may be changed to fit other applications by changing values of resistors and voltages, and by changing saturable reactor designs.

The switching described herein is a combination of transistor-switches and relay-switches. These were chosen for a particular application as being the most compatible. However, for other applications, other combinations of switch-types and, in some cases, use of only one switch-type may be more desirable. Also, there are other versions of a transistor-switch circuit which could be used; and, some electron-tube circuits might be applicable for switching.

Obviously many modifications and variations of the present invention are possible in the light of the above teachings. It is therefore to be understood that within the scope of the appended claims the invention may be practiced otherwise than as specifically described.

What is claimed is:

1. A magnetic integrator having a settable total-integral value and which will give a measure of the time integral of a voltage that may vary in magnitude comprising a saturable core having an integrating winding, two A.C. windings connected in series and across an output, and a setting winding all wound thereon, said integrating winding having a tap and first and second terminals at opposite ends thereof, first and second switching means, said first switching means having first and second positions and being operable to control a timer-switch means which in turn is operable to control said second switching means, when in the first position said first switching means being operable for causing a first D.C. voltage to be applied across the portion of said integrating winding between said tap and said first terminal, said timer-switch means also being operable for causing a setting voltage to be applied across said setting winding only when said first switching means is in the second position, said setting voltage being proportional to the integral desired, said first D.C. voltage being operable to drive and hold said saturable core saturated in one direction while said first switching means is in said first position and said setting voltage being operable to drive said saturated core to an intermediate flux level when said first switching means is in said second position, said second switching means being kept in off position by said timer-switch means when said first switching means is in first position, said timer-switch means being operable to cause said second switching means to operate while said first switching means is in said second position after said setting voltage applied across said setting winding has caused said saturable core to reach an intermediate flux level and the setting voltage has been removed therefrom, said second switching means being operable to apply a second D.C. voltage across said integrating winding between said first and second terminals such as to drive said saturable core back toward its original saturation state over a predetermined time interval, said second D.C. voltage being integrated over said predetermined time interval, the impedance of said A.C. windings changing abruptly when said saturable core returns to its original saturation state and thus being operable to signal at said output the completion of the integration of said second D.C. voltage.

2. A magnetic integrator having a settable total-integral value and which will give a measure of the time integral of a voltage that may vary in magnitude comprising a saturable core having an integrating winding two A.C. windings connected in series and across an output, and a setting winding all wound thereon, the maximum integral value of the magnetic integrator being determined by the magnetic and physical characteristics of said saturable core and integrating winding, said integrating winding having a tap and first and second terminals at opposite ends thereof, first and second switching means, said first switching means having first and second positions and being operable to control a timer-switch means which in turn is operable to control said second switching means, when in the first position said first switching means being operable for causing a first D.C. voltage to be applied across the portion of said integrating winding between said tap and said first terminal, said timer-switch means also being operable for causing a setting voltage to be applied across said setting winding only when said first switching means is in the second position, said setting voltage being proportional to the total integral desired, said first D.C. voltage being operable to drive and hold said saturable core saturated in one direction while said first switching means is in said first position and said setting voltage being operable to drive said saturable core to an intermediate flux level when said first switching means is in said second position, said second switching means being kept in off position by said timer-switch means when said first switching means is in first position, said timer-switch means being operable to cause said second switching means to operate while said first switching means is in said second position after said setting voltage applied across said setting winding has caused said saturable core to reach an intermediate flux level and the setting voltage has been removed therefrom, said second switching means being operable to apply a second D.C. voltage across said integrating winding between said first and second terminals such as to drive said saturable core back toward its original saturation state over a predetermined time interval, said second D.C. voltage being integrated over said predetermined time interval, the impedance of said A.C. windings changing abruptly when said saturable core returns to its original saturation state and thus being operable to signal at said output the completion of the integration of said second D.C. voltage.

3. A magnetic integrator having a settable total-integral value and which will give a measure of the time integral of a voltage that may vary in magnitude comprising a saturable core having an integrating winding, an A.C. winding connected across an output, and a setting winding all wound thereon, first and second switching means, said first switching means having first and second positions and being operable to control a timer-switch means which in turn is operable to control said second switching means, when in the first position said first switching means being operable for causing a first D.C. voltage to be applied across a portion of said integrating winding, said timer-switch means also being operable for causing a setting voltage to be applied across said setting winding only when said first switching means is in the second position, said first D.C. voltage being operable to drive and hold said saturable core saturated in one direction while said first switching means is in said first position and said setting voltage being operable to drive said saturated core to an intermediate flux level when said first switching means is in said second position, said second switching means being kept in off position by said timer-switch means when said first switching means is in first position, said timer-switch means being operable to cause said second switching means to operate while said first switching means is in said second position after said setting voltage applied across said setting winding has caused said saturable core to reach an intermediate flux level and the setting voltage has been removed therefrom, said second switching means being operable to apply a second D.C. voltage across the entire said integrating winding such as to drive said saturable core back toward its original saturation state over a predetermined time interval, said second D.C. voltage being integrated over said predetermined time interval, the impedance of said A.C.

winding changing abruptly when said saturable core returns to its original saturation state thus signalling at said output the completion of the integration of said second D.C. voltage.

4. An integrator as in claim 3 wherein said setting voltage is proportional to the total integral desired.

5. An integrator as in claim 3 wherein the maximum integral value of the magnetic integrator is determined by the magnetic and physical characteristics of said saturable core and said integrating winding.

References Cited in the file of this patent

UNITED STATES PATENTS

| | | |
|---|---|---|
| 2,810,519 | Creusere | Oct. 22, 1957 |
| 2,822,511 | McLean et al. | Feb. 4, 1958 |
| 2,875,952 | Barry | Mar. 3, 1959 |

OTHER REFERENCES

Dyer: Journal of Scientific Instruments, July 1958, pages 240–242. (Copies in Div. 23 and Scientific Library.)